Dec. 28, 1954
P. E. BURCH
2,698,060
ENGINE HEAT DEFLECTING ENCLOSURE WITH
MOVABLE SIDE DOOR FOR TRACTORS
Filed June 30, 1952
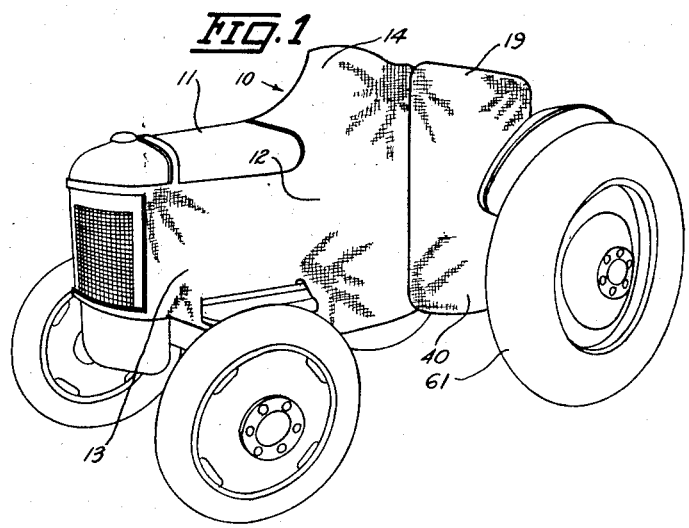
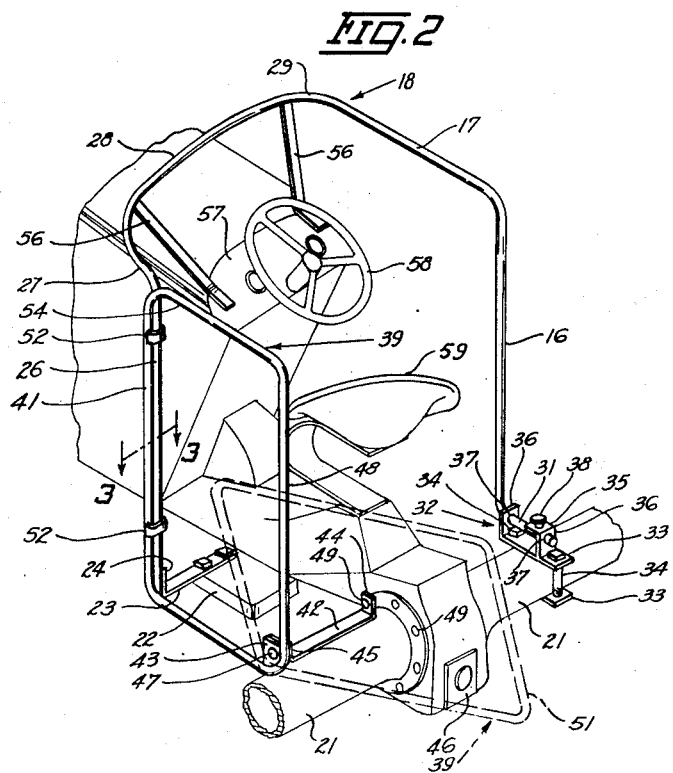
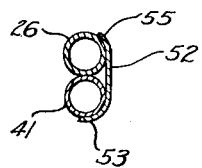
INVENTOR.
PAUL E. BURCH
BY
ATTORNEY.

United States Patent Office 2,698,060
Patented Dec. 28, 1954

2,698,060

ENGINE HEAT DEFLECTING ENCLOSURE WITH MOVABLE SIDE DOOR FOR TRACTORS

Paul E. Burch, Fort Dodge, Iowa, assignor to Fort Dodge Tent & Awning Company, Fort Dodge, Iowa, a corporation of Iowa Application June 30, 1952, Serial No. 296,449

3 Claims. (Cl. 180—54)

This invention relates generally to a heat deflecting enclosure for farm tractors of the type in which the heat from the tractor engine is directed to the zone of the operator's seat and more particularly to an enclosure of this type having an operator's entrance door in one side thereof.

Heat deflecting enclosures for tractors made of a flexible material such as canvas or the like are generally well known and usually consist of a body and cowl section arranged about the front of the tractor, so as to direct the tractor engine heat into the zone of the tractor operator. These enclosures also usually include a pair of permanent side sections continuous with the cowl and body section and disposed on opposite sides of the tractor seat, so that the operator must enter and leave his position on the tractor through the open rear end of the enclosure. This necessitates climbing over the tractor rear axle which is objectionable in certain types of tractors, especially the Ford tractors, because they include a power unit and controls which are difficult to climb over, especially when an implement is connected to the tractor. These tractors are generally provided with a foot plate or step mounted on one side of the tractor frame so that the operator can mount the tractor by using the foot plate and moving between the tractor body and the front portion of one of the tractor rear wheels. This invention, therefore, provides a heat deflecting enclosure having a movable door which can be moved to an open position to permit the use of the foot plate by the operator when mounting and leaving the tractor.

It is an object of this invention, therefore, to provide an improved enclosure for tractors.

Another object of this invention is to provide for a tractor an enclosure which can easily and quickly be entered from the side thereof by the tractor operator.

A still further object of this invention is to provide a tractor enclosure which is of a rugged construction, economical to manufacture, and easy to install on tractors now in use.

Further objects, advantages and features of this invention will become apparent from the following description when taken in connection with the accompanying drawing in which:

Fig. 1 is a perspective view of the enclosure of this invention shown in assembly relation with a tractor;

Fig. 2 is a perspective view of the frame structure which forms part of the enclosure and the elements of the tractor to which such structure is attached; and Fig. 3 is an enlarged sectional detail view as seen along the line 3—3 in Fig. 2.

With reference to the drawing, the enclosure of this invention is shown generally at 10 in Fig. 1 applied to a farm tractor 11. The enclosure 10 consists generally of a body section 12 having two side panels 13, only one of which is shown, positioned on opposite sides of the tractor engine and continuously formed with a connecting cowl portion 14. The side panels 13 and cowl portion 14 are composed of a canvas or like material and form a continuous passageway for deflecting the heated air from the tractor engine into the zone of the tractor operator, and with this heated air being moved through such passageway by the engine radiator fan (not shown). On the right side of the tractor 11, the cowl portion 14 extends rearwardly and is fastened to a vertical section 16 and a horizontal section 17 of a main frame 18 so as to form a permanent side wing disposed to the right side of the tractor seat 59. A movable door or side wing 19 is positioned on the left side of the tractor seat 59.

The tractor 11 is provided with a horizontal foot plate or step 22 secured to the tractor frame at a position forwardly of the tractor rear wheel 61. Attached at one end to the foot plate 22 is a generally L-shaped bracket 23 having a vertically extended leg 24 at its other or outer end. The main frame 18 has a vertical section 26 secured at its lower end to the vertical leg 24 of the bracket 23. Extended forwardly from the top end of the vertical section 26 is one leg 27 of a generally U-shape section 28 of the main frame 18. The U-shape section 28 is located forwardly of the steering wheel 58 in a substantially horizontal plane and is held in a position above the level of the engine cowl of the tractor 11 by a pair of braces 56 secured to the instrument panel 57 at opposite sides of the steering wheel 58. The other leg 29 of the U-shape section 28 is extended rearwardly to form the horizontal section 17 which terminates in the downwardly extended vertical section 16. The rear edge of the cowl portion 14 of the body section 12 is attached in any suitable manner to the main frame 18.

The bottom end of the vertical section 16 of the main frame 18 is bent rearwardly to form a horizontal extension 31 which is clamped to the rear axle 21 by means of a clamp 32. The clamp 32 consists of a pair of horizontal straps 33 securely held on opposite sides of the axle 21 by a pair of bolts 34. A pair of vertical projections 36 on the top strap 33 are provided with holes 37 for receiving the horizontal extension 31. Attached to one of the vertical projections 36 is a horizontal member 35 which carries a set screw 38 for holding the horizontal extension 31 against movement relative to the projections 36.

The movable door 19 consists of a frame 39, provided with a canvas or like covering 40, positioned so that its front member 41 is in contact engagement with the vertical section 26 of the main frame 18. The door frame 39 is supported on the tractor by a generally U-shape arm 42 having upturned legs 44 and 45, with the leg 44 being attached as by a bolt 49 to the tractor transmission housing 46 so that the arm 42 extends transversely of the tractor toward the rear wheel 61. A pivot pin 47 is extended through the leg 45 and a pivot support 43 at the lower end of the rear member 48 of the door frame 39 to pivotally support the door frame 39 for swinging movement in a vertical plane toward and away from the vertical section 26 of the main frame 18. Thus, the door 19 may be manually swung in a vertical plane about the bolt 47 between a closed position shown in Figs. 1 and 2 and an open position shown at 51 in dotted lines in Fig. 2.

A pair of clips 52 (Fig. 3) have ends 53 and 55 curved to fit the shape, respectively, of the front member 41 of the door frame 39 and the vertical section 26 of the frame member 18. The curved ends 53 of the clips 52 are welded or otherwise securely fastened at vertically spaced positions to the front member 41 so that the ends 55 are engageable with the vertical section 26 when the door 19 is in a closed position therefor. The door 19 is thus held by the clips 52 against pivotal movement forwardly of the section 26 and movement outwardly of the vertical plane in which the door 19 swings. The side by side relation of the front member 41 with the vertical section 26 holds the door 19 against movement inwardly out of the plane of its movement and the weight of the door 19 prevents any accidental pivotal movement thereof toward its open position. When it is desired to open the door 19, the operator simply grasps the top member 54 of the door frame 39 and manually swings the door to its open position illustrated in dotted lines in Fig. 2. To close the door 19, it is only necessary to manually swing it in the opposite direction until the clips 52 engage the vertical section 26 which thus functions as a door stop member.

Thus, the tractor operator can enter and leave his position on the tractor seat 59 by opening the door 19 and using the foot plate 22 to assist him in moving between the rear wheel 61 and the vertical section 26 of the main frame 18 to thereby obviate the necessity of climbing over the tractor equipment positioned adjacent the rear axle 21.

Although the invention has been described with respect to a preferred embodiment thereof, it is to be understood that it is not to be so limited since changes can be made therein which are within the full intended scope of this invention as defined by the appended claims.

I claim:

1. For use with a tractor having a rear axle and an operator's seat disposed forwardly of said axle, an enclosure for the operator's seat including a pair of side sections positioned on opposite sides of the operator's seat, with one of said sections terminating in a vertical door member, means for pivotally attaching the lower end of said door member to the tractor rear axle for pivotal movement of said door member in a vertical plane, said door member being of a size such that in its closed position its front end is positioned forwardly of the operator's seat.

2. For use with a tractor having a rear axle and a horizontal foot plate attached to one side of said tractor forwardly of said rear axle; an enclosure unit including a frame having an upright section thereof attached to and extended upwardly from said foot plate, and an upright door member pivotally attached at its rear end to said tractor rear axle for pivotal movement in a vertical plane, said door member in its closed position being extended forwardly from said rear axle so that its front end is adjacent said upright section of said frame.

3. For use on a tractor having a rear axle and an operator's seat disposed forwardly of said rear axle; a heat deflecting enclosure including a frame having a vertical section thereof attached to one side of said tractor forwardly of the operator's seat, a vertically extended side door member for said enclosure positioned on said one side of said tractor opposite the operator's seat, means pivotally attaching said door member at its rear end to said tractor rear axle for pivotal movement in a vertical plane, and clip means attached to the front end of said door member and extended therefrom so as to be in contact engagement with the vertical section of said frame when said door member is in its closed position.

References Cited in the file of this patent

UNITED STATES PATENTS

| Number | Name | Date |
|---|---|---|
| 2,423,748 | Acheson | July 8, 1947 |
| 2,460,399 | Schassberger | Feb. 1, 1949 |
| 2,584,329 | Clapper | Feb. 5, 1952 |

FOREIGN PATENTS

| Number | Country | Date |
|---|---|---|
| 641,943 | Germany | Feb. 18, 1937 |
| 876,967 | France | Aug. 24, 1942 |